Patented Aug. 21, 1951

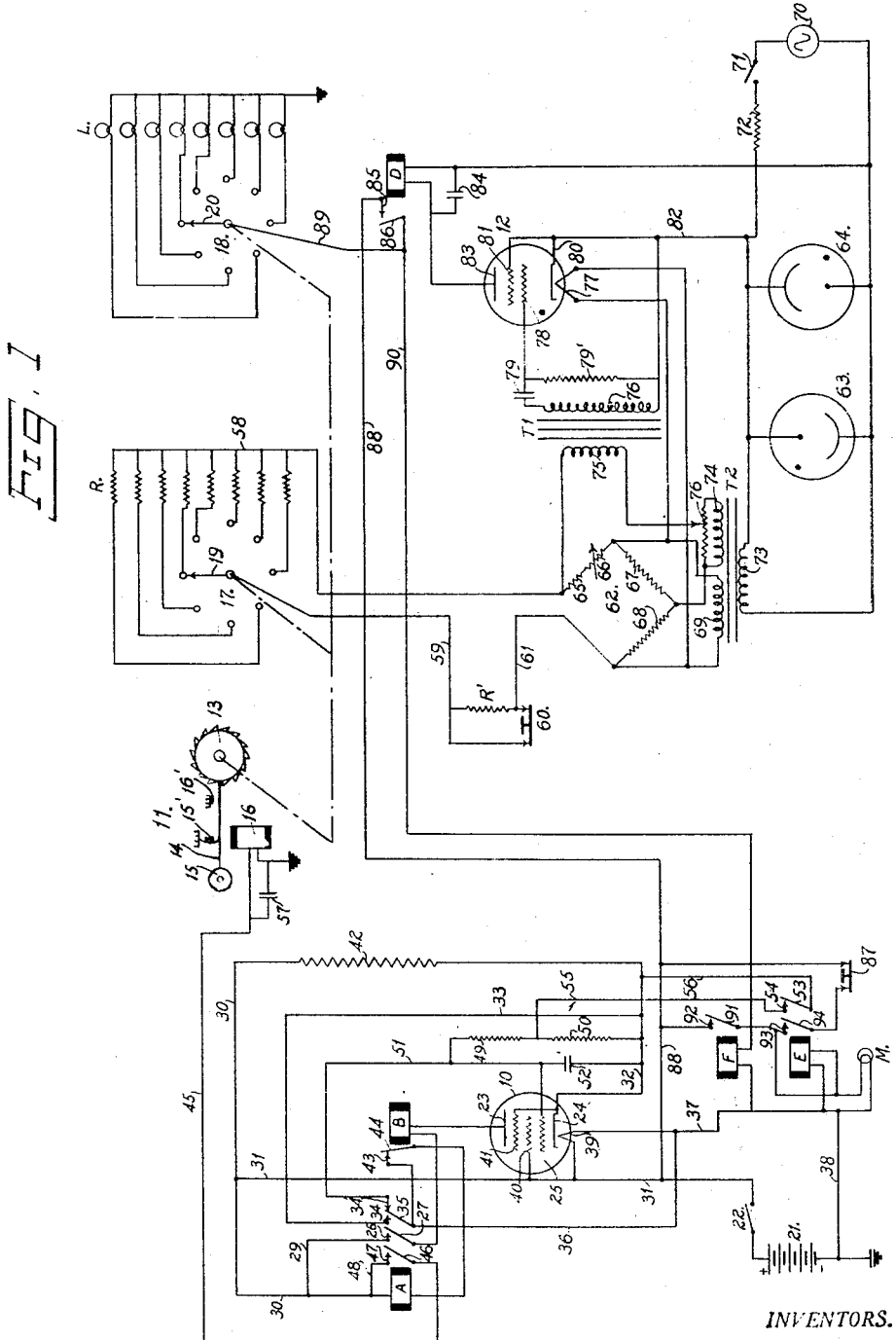

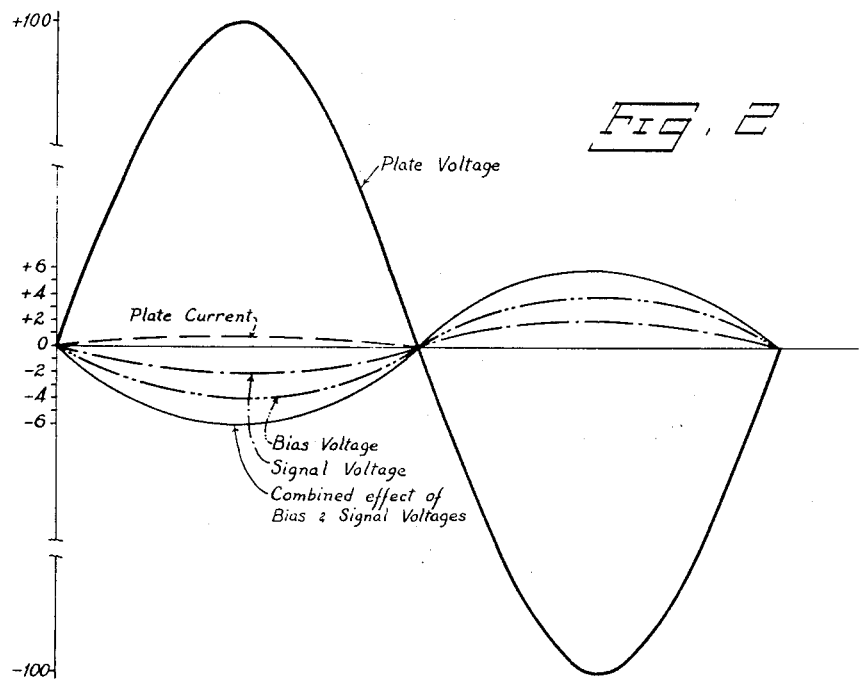
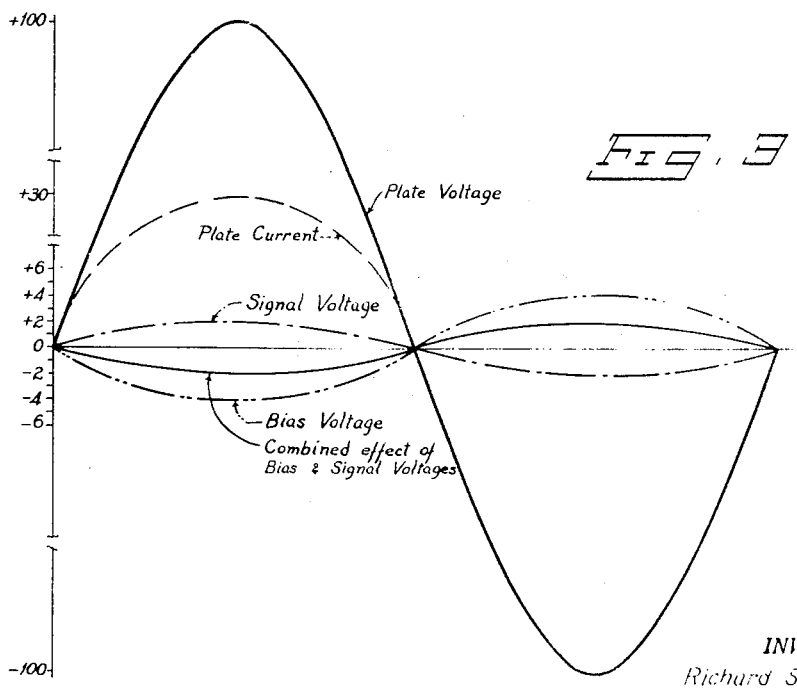

2,565,271

UNITED STATES PATENT OFFICE 2,565,271

AUTOMATIC TEMPERATURE INDICATING SYSTEM

Bertram E. Sealander, Jersey City, N. J., and Richard S. Bergen, Westbury, N. Y., assignors to Republic Aviation Corporation, Farmingdale, N. Y., a corporation of Delaware Continuation of abandoned application Serial No. 730,156, February 21, 1947. This application May 13, 1950, Serial No. 161,763

23 Claims. (Cl. 177—311)

This application is a continuation of the application for patent, Serial No. 730,156, filed February 21, 1947, now abandoned, by Richard S. Bergen and Bertram E. Sealander for Automatic Temperature Indicating Systems, wherein the invention relates to electrical signalling apparatus for indicating at a central position or station changes in conditions existing at each of a plurality of separated points or remote secondary stations wherein provision is made for altering the frequency of such indications to obtain a more detailed and comprehensive record of the changes and the extent thereof.

Although this invention may be of use in many applications requiring the transmission of information from a plurality of separately located points or secondary stations to a central or primary position or station, its many advantages are more fully realized when employed as an aircraft fire detector and alarm system where mechanical and electrical stability, sensitivity and speed of transmission or indication are necessary prerequisites for dependable, efficient service.

To this end a relatively simple and effective detecting and indicating system is proposed wherein a change in a predetermined condition, such as temperature, at each of a plurality of remote secondary positions or stations may be detected and a signal representing such change transmitted to a central or primary position or station to there provide an indication denoting the secondary point or station where the change has occurred. This is accomplished in the illustrated embodiment of the invention by an electronically controlled selector switch associated with a multiple electronic indicator, each of which employs a minimum of the electro-mechanical components that have generally limited the stability and/or sensitivity of a unit of this character.

By interposing a speed control circuit between the two aforementioned components and their circuits, the detection of a change in a predetermined temperature at one or more secondary stations may be employed to produce automatically more rapid indications of changes occurring at all detector positions or secondary stations. Many advantages of this invention become apparent in its application to aircraft, since fire aboard an aircraft in flight often results in its complete destruction and it is essential that every possible precaution be taken not only to detect its presence, but to determine its rate and direction of spread so that it may be quickly brought under control. With the present invention, the speed of transmission of signals or impulses from the several secondary stations to the central station is increased upon the initiation of signals from one secondary station during such an emergency while the normal slower speed is used at other times to maintain the wear on mechanical components, such as the selector switch, at a minimum. Thus any spread or extension of the fire is instantly identified and picked up by the central station.

With the above and other objects in view, as will be apparent, the invention consists in the construction, combination and arrangement of parts, all as hereinafter more fully described, claimed and illustrated in the accompanying drawings, wherein:

Fig. 1 is a wiring diagram of the circuits and schematic representations of the components of the present invention arranged for use as a fire detector aboard an aircraft;

Fig. 2 is a set of curves illustrating the relationship between the controlling and controlled voltages of the electronic indicating circuits (shown in Fig. 1) situated at the central station under normal operation; and Fig. 3 is a set of curves similar to those in Fig. 2 showing the relationship between these voltages upon abnormal operation of the system to indicate the presence of fire or change in temperature.

The illustrated embodiment of the present invention employs, at its central station, an electro-mechanically operated selector switch associated with an electronic oscillator as its driving means. This selector switch functions to sequentially connect a distributed series of temperature detectors, each constituting a secondary station, with an electronic or thyratron amplifier which, in effect, functions as a switch or relay periodically connecting each of the detectors to a corresponding or companion lamp in a series of lamps, thereby indicating a change in temperature at the connected detector station when the circuit including both the central and secondary station is energized. By suitably interconnecting the oscillator with the amplifier, the latter will act to raise or increase the oscillator frequency and consequently increases the speed of the scanning or selector switch to decrease the time lapse between the periodic connections of individual detector stations and its companion lamp or indicator.

Although the employment of a power switch for sequentially transmitting measurements from a plurality of detector or secondary stations to a central station or common indicator or recorder is admittedly old, the circuit and component arrangement hereof as well as the control of the power switch to increase and decrease the scanning or switching speed under predetermined temperature conditions at the secondary or detector stations do represent a definite advance over the art and constitutes the major features of this invention.

Referring to the drawings, the vacuum tube 10 with its associated circuits and electrical components constitute an oscillator for operating the power switch 11 and the tube 12 with its associated components constitute an amplifier or electronic switch to control the indicators operable upon the presence of fire or unusual heat at one or more several detector or secondary points or stations.

The power or step selector switch 11 in this embodiment of the invention includes a ratchet 13, an electromagnetically actuated pawl 14 pivoted at 15 and cooperating at its free end with the ratchet 13 to advance the latter one notch or tooth each time the pawl is moved by the electromagnet 16. The spring 15', fastened at one of its ends to the pawl 14 and at its other end to a stationary part of the switch, acts to return the pawl to its inactive position against the stop 16' upon its release by the magnet 16 where said pawl engages the next successive tooth of the ratchet 13. Associated with the switch 11 are two banks or series of contacts 17 and 18, each shown as comprising a series of eight stationary contacts arranged in a circular formation with contact arms 19 and 20 respectively pivoted at the center of the cooperating series. These contact arms 19 and 20 are mechanically coupled with and actuated by the ratchet 13 and are thus concurrently moved from one contact to the next each time the pawl 14 is actuated by the magnet 16.

The oscillator tube 10 obtains its electric power from the battery 21 through the "on-off" switch 22 and operates to periodically energize the coil 16 of the selector switch 11 to produce the periodic rotation of the ratchet 13 in the manner and for the purpose described. This is accomplished through the use of an electromagnetic or relay coupling between the plate circuit of the tube 10 and the coil or magnet 16 of the switch 11, and will become apparent from the following detailed description of the several circuits constituting the oscillator.

The plate circuit of the tube 10 includes the plate 23 of the tube, the coil of the relay B, normally open contacts 26—27 of the relay A, leads 29—30—31, the battery 21 and ground. The remainder of the plate circuit includes the cathode 24 of the tube 10 and is more properly termed the cathode circuit. This circuit consists of the cathode 24, leads 32 and 33, the normally open contacts 34—35 of the relay A and leads 36, 37 and 38 to the ground side of the battery 21. The filament 39 of the tube 10 is heated by the battery 21 through connections to leads 31 and 37 and the grids 40 and 41 are connected in the conventional manner to the high voltage lead 31 and the cathode 24 respectively.

The circuit associated with the control grid 25 of the tube 10 operates in conjunction with and is controlled by the normally closed contacts 34'—35 of the relay A which relay is in turn actuated by the contacts 43 and 44 of the relay B in the plate circuit of the tube 10. This interconnection between the plate or controlled circuit and the grid or controlling circuit results in an oscillatory action and causes the alternate energization and de-energization of the relays A and B and actuation of the switch 11.

The electro-magnetic switch 11 is connected between ground on the one side and the positive or switch side of the battery 21 on the other, the latter connection being accomplished through lead 45, contacts 46—47 of relay A and leads 48, 30 and 31. Therefore, with the switch 22 in its "on" or "closed" position and the tube 10 performing its normal cyclic operation of relays B and A, the coil 16 of the switch 11 will be alternately energized and de-energized (through contacts 46—47) in synchronism with the cyclic operation of the tube 10 to operate the ratchet 13 and swing the contact arms 19 and 20 respectively over the banks or series of contacts 17 and 18 as aforesaid.

More specifically the grid or control circuit includes, in addition to the charging resistor 42 which is connected between leads 30 and 32, the resistors 49 and 50 connected in series between the grid 25 and the cathode 24 by means of leads 51 and 32 respectively. A condenser 52, also connected between the grid 25 and cathode 24, operates together with the resistors 49 and 50 to determine the frequency of the oscillator and therefor the scanning or switching rate of the switch 11. Associated with the resistors 49 and 50 are contacts 53 and 54 of the relay E connected between the center connection of these resistors and the lead 32 by leads 55 and 56 respectively. Under circuit conditions energizing relay E its contacts 53 and 54 will close, shortcircuiting the resistor 50 to increase the scanning rate of the switch 11 an amount proportional to the percentage of the combined resistance of resistors 49 and 50 that is shortcircuited.

To operate the oscillator, the switch 22 is closed to apply voltage from the battery 21 to the filament 39, the relay A through contacts 43 and 44 of relay B and the condenser 52 through leads 31 and 30, the charging resistor 42, leads 32 (through the condenser 52), contacts 34' and 35 of relay A, and leads 36, 37 and 38 to ground. Since the condenser 52 accepts the electrical charge instantaneously, this operation is accomplished before the relay A can be energized to open the charging circuit contacts 34—35. Upon actuation of the relay A, the charging contacts 34' and 35 will open, contacts 26 and 27 will close to complete the plate circuit, contacts 34 and 35 will close to complete the cathode circuit and contacts 46 and 47 will close to energize the coil or magnet 16 of the switch 11 and advance the ratchet 13 thereof one step.

At this point the charge in the condenser 52 will provide a voltage for the control grid 25 which by reason of the normal action of a vacuum tube, will limit the flow of electric current through the plate and cathode circuits to a value that will not actuate the relay B. The resistors 49 and 50, connected to short circuit the condenser 52, gradually bleed off or dissipate the voltage or charge thereon. This action is accompanied by a corresponding increase in the current of the plate circuit and this current slowly increases until it actuates the relay B and opens its contacts 43 and 44. Since contacts 43 and 44 control the voltage on relay A, the latter is de-energized when these contacts 43 and 44 open and its contacts 26 and 27 and 34 and 35 open to break the plate and cathode circuits. Similarly contacts 46 and 47, also on relay A, will open to allow the switch 11 to reset itself for the next operation and contacts 34' and 35 of relay A will close to recharge condenser 52. Relay B is now de-energized by the interruption of plate current and it contacts 43 and 44 are therefore closed.

The circuit is now in the condition existing at the moment the battery switch 22 was originally closed and the identical process is automatically and continually repeated. Since the contacts 46 and 47 of relay A control the operation of the switch 11, its frequency of operation will be dependent on the frequency of the operation of the relay A and therefore the oscillator frequency. A condenser 57 bridged across the coil 16 of the switch 11 limits the frequency of operation of the switch 11 to a maximum value consistent with satisfactory operation of the switch and the circuits associated with its banks or series of contacts 17 and 18.

As previously mentioned, the particular embodiment of the invention here chosen is a fire alarm system for aircraft and is therefore arranged to detect a rise in temperature beyond a predetermined critical point in the vicinity of one or more remotely positioned detectors at the secondary stations. For this purpose a series of detectors each comprising a resistor element R the resistance value of which is a function of temperature is used as the detecting elements and positioned at points or stations throughout the aircraft where fire or radical temperature change is most likely to occur. One side of each of these detecting elements R is connected to one contact of the series or bank of contacts 17 of switch 11 while the remaining side is returned to a common lead 58 connected to the Wheatstone bridge 62. The rotatable contact arm 19, which successively contacts each detector R, is connected to the bridge 62 through lead 59, test switch 60 and lead 61. As the power switch 11 is operated to advance the ratchet 13, it is apparent that the control arm 19 will also be advanced to successively engage the contacts 17 by reason of the mechanical connection between it and said ratchet. As the arm 19 is stepped forward it will insert each resistor R successively in the bridge 62 and will continue to repeat the process so long as the oscillator and switch operate.

The resistor R', connected between leads 59 and 61, is shortcircuited by the normally closed switch 60. The operation of this switch will insert the resistor R' in series with each successive detecting element as the contact arm 19 is rotated. Since the value of the resistor R' is chosen so that its series connection with each successive detecting element in a normal ambient temperature zone will present a total resistance to the bridge 62 equal to the resistance value of the detector R under conditions indicating presence of fire or change of temperature, opening of switch 60 during the operation of the equipment will present an electrical condition to the indicating circuits simulating the presence of fire at each of the detector stations throughout the aircraft and thereby provide a complete operating test of the equipment.

The amplifying system includes the Wheatstone bridge 62, transformers T1 and T2, the relay D and two voltage regulating tubes 63 and 64. The Wheatstone bridge 62 consists of four resistance branches or legs connected to form a closed circuit. This circuit is very well known in the art and its operation will not be described in detail other than to mention that an operating voltage is applied to opposing junctions of the four legs of the Wheatstone bridge 62 and an amplifier sensitive to voltage changes is connected to the remaining junctions. With this arrangement, a small change in the resistance value of one of the legs of the bridge 62 will produce a relatively large change in voltage appearing between the points of junctions to which the amplifier is connected.

In the instant form of the invention the bridge 62 includes resistor 65, variable resistor 66, resistor 67, resistor 68, and a detecting element R, the latter being connected to the bridge through the series or bank of contacts 17 of the power switch 11 as heretofore described. The voltage supply is obtained from the secondary winding 69 of the transformer T2 which is powered by a suitable alternating current sour e 70 connected through a switch 71 and resistor 72 to the primary winding 73 of the transformer T2.

To provide a stabilized supply of power for the bridge 62, as well as for the other amplifying circuits, a pair of gas filled voltage regulator tubes 63 and 64 are connected in opposition, one to the other, across the power supply 70. Each of these tubes conduct electric current in only one direction, much the same as a rectifier tube, with the exception that the current through the tube varies with the voltage across the tube and this variation together with the resistor 72, provides a constant voltage across the tubes compensating for reasonable variations in the supply voltage or load requirements. It is to be noted that since the voltage used to power the amplifying circuits is of an alternating character, it is necessary to employ two regulator tubes in order to limit or control the peak voltages obtained from the supply 70 as the polarity or direction of current flow alternates.

The output terminals of the bridge 62; to wit: the juncture of resistors 67 and 68 and resistors R and 65 are connected to the input or primary winding 75 of the transformer T1. The latter juncture (R—65) is connected directly to the winding 75 whereas the former (67—68) has a potentiometer or adjustable resistor 76 in parallel with the winding 74 of the transformer T2, interposed between it and the winding 75. The winding 74 of the transformer T2 is connected so that its voltage normally opposes the voltage produced by the winding 69. i. e., one is 180° out of phase with the other. Under operating conditions the difference between the voltages presented by the Wheatstone bridge 62 and the winding 74 is impressed on the winding 75 of the transformer T1 and constitutes the actuating voltage for the tube 12. This voltage then appears across the secondary winding 76 and since the number of turns on the secondary winding 76 is much greater than that on the primary winding 75, its magnitude or amplitude is greatly increased.

The thyratron tube 12, is of the gas filled type and for present purposes may be said to constitute or function as a relay or switch. The filament 77 of this tube is directly connected to and heated by the secondary winding 69 of the transformer T2. The grid or input circuit includes the control grid 78 (the equivalent of a relay coil) connected to the winding 76 through the blocking condenser 79 and a grid resistor 79' inserted between the grid 78 and cathode 80. The remaining terminal of the winding 76 is connected to the cathode 80 which, together with the screen grid 81, is connected to one side of the alternating current supply 70 by lead 82. The plate circuit of the tube 12 includes its plate 83 in series with the coil of the relay D and the remaining side of the power supply. A condenser 84 may be connected across the coil of the relay D to prevent chattering or vibration of the relay contacts 85 and 86 under conditions where a direct current relay is used.

To operate the amplifier just described, the switch 71 is closed to apply power to the primary winding 73 of the transformer T2 and to the circuits including the plate 81 and the cathode 89 of the tube 12. Energizing of the transformer T2, induces voltages in windings 69 and 74 which supply the operating voltages to the bridge 62 and the filament 77 of the tube 12. Assume that the oscillator and switch 11 are not operating and only one detecting element R (that connected with the contact arm 19 as shown in the drawing) is connected to actuate the amplifier: and for the purpose of the present disclosure also assume that the tube 12 will operate to actuate relay D and close its contacts 85 and 86 when the detector R is heated to a temperature of approximately 160° Fahrenheit. Then with these assumed conditions fixed, the detector R is heated to some arbitrary temperature below 160° and the resistor 66 of the bridge 62 is adjusted so that no voltage will appear across the junctures of detector R with resistor 65 and of resistor 67 with resistor 68. This procedure is known as "balancing the bridge."

The tube 12 may be compared with a relay in that the voltage applied to its control grid 78 (relay coil) determines whether the tube will draw its maximum or minimum current (closing or opening of the relay contacts). When the voltage on the grid 78 is raised above a given negative value of e. g. —3 volts, the grid loses complete control of the plate circuit and the tube will draw maximum current. On the other hand as long as the voltage on the grid remains at a value below —3 volts, or say —4 volts, the tube will draw negligible plate current and will not actuate the relay D.

Referring to the curves, representing diagrammatically the operation of tube 12 in Fig. 2, the large solid curve represents the alternating "plate voltage" applied to the plate 83 while the lower broken curve labeled "plate current" represents the electric current flowing through the tube 12 and the relay D while the tube is in its non-conducting or non-actuated state. It is to be noted that the tube 12 is operable to conduct or cause a current to flow through the plate circuit only during the first half of the alternating current cycle which is in the positive direction as indicated in Figs. 2 and 3. Below the horizontal line in Fig. 2 are three additional curves which illustrate the phase and amplitude of the "bias voltage" produced by the winding 74 of transformer T2, the "signal voltage" produced by the bridge 62 and the combined effect or sum of the bias and signal voltages which is the voltage ultimately impressed on the grid 78 and determines the operation of the tube 12. In the particular condition represented by Fig. 2, the bias voltage is fixed at —4 volts which is one volt below the critical voltage of —3 volts for actuation of the tube. Under a condition where the element R has cooled to a temperature somewhat below the balance point of the bridge, as previously described, the output voltage across the vertically disposed bridge junctures, as shown in Fig. 1, may be of the order of —2 volts.

This value together with the —4 volt bias will produce an effective voltage of —6 volts on the primary winding 75 of transformer T1. Assuming for the sake of clarity that the voltage ratio of this transformer is 1:1, a voltage of —6 will appear on the grid 78 and little or no plate current will flow through the tube 12 and relay D.

Upon heating the detector element R to a point above 160° Fahrenheit, two changes result in the curves shown in Fig. 2 and these changes are illustrated in Fig. 3. The output or signal voltage from the bridge 62 has now shifted from a value of —2 to a value of +2 volts. Since the bias voltage has remained unchanged the resulting voltage affecting the control grid 78 is the algebraic sum of the two or —2 volts as shown by the solid curve below the zero line. This voltage is one volt above the critical value of —3 volts and the tube 12 will be actuated and draw a substantially increased plate current, illustrated again by the larger broken curve above the horizontal zero line, and operate relay D to close its contacts 85—86. When the signal voltage from the bridge 63 drops to or below the zero point at which the bridge 62 was balanced, the grid 78 will regain control of the tube 12 during the ensuing half of the plate voltage cycle when it is in the negative direction and the tube is inoperable.

The remainder of the system includes a series of indicating lamps L each connected between ground and one of the bank or series of contacts 18, the relays E and F, a master indicating lamp M and a control switch 87. One lamp L is provided for and is the companion of each detecting element or resistor R and since the contact arms 19 and 20 of the power switch 11 are synchronized, the transient illumination of one or more of the lamps L will indicate which of the several detectors R have been heated to the point indicating presence of fire in the aircraft or at least a decided rise temperature at one or more of the secondary or detector stations.

The contact 85 of relay D is connected through leads 88 and 31 and switch 22 to the positive side of the battery 21. The contact arm 20 of the switch 11 is connected by lead 89 to lead 90 which in turn connects contact 86 of relay D to the ground side of battery 21 through the coil of relay F and leads 37 and 38. The relay E, with the master indicating lamp M in parallel therewith, is connected on one side by leads 37 and 38 to the ground on on the other side through contacts 91 and 92 of relay F to the positive side of the battery 21 by means of leads 88 and 31 and switch 22. A pair of electrical locking contacts 93 and 94 on relay E are connected to bypass the contacts 91 and 92 of relay F and, with the control switch 87 closed, will maintain the relay E in the energized condition upon its initial activation by the closure of contacts 91 and 92 of relay F.

In the operation of this alarm system, the detectors R are placed at critical positions or stations throughout the aircraft and connected as described to the series 17 of contacts of the switch 11 located at a central station in the aircraft. The lamps L may be arranged in any desirable formation that will immediately indicate to the observer the particular part or parts of the aircraft in which a fire or upward temperature change has occurred. With the apparatus properly positioned and connected to the power sources 21 and 70, switches 22 and 72 are closed. The circuit associated with the vacuum tube 10 will be energized and periodic pulses transmitted to the power switch 11.

Since the frequency of these pulses, and therefore the scanning speed of the control arms 19 and 20, is governed by the condenser 52 and resistors 49 and 50, it will be assumed that the speed of rotation has been adjusted so that the contact arms 19 and 20 will idly scan each of its associated contacts once during each minute of operation. With the switch 71 also closed, the amplifying circuit will be energized and upon balancing the bridge 62 and adjusting the biasing voltage from the winding 74, as described, the entire unit is ready for the detection of temperature change or of fire. Assuming that one of the detectors R is at this moment connected to the bridge 62 and that its ambient temperature has risen to a point above 160° Fahrenheit, the tube 12 will be actuated to energize relay D, closing its contacts 85 and 86 and supplying current to the companion lamp L associated with that detector R. As the contact arms 19 and 20 are rotating constantly and in synchronism, the lamp L will remain illuminated only during the period that its associated detector R is connected to the bridge 62. Upon the momentary closing of the contacts 85 and 86 of relay D, relay F will be energized and its contacts 91 and 92 closed: this completes the battery circuit to relay E and lamp M and closes contacts 53 and 94 and 53 and 54. Because the contacts 93 and 94 are locking contacts for relay E they complete an auxiliary battery circuit to the relay E and maintain it in the energized condition until such time as the control or reset switch 87 is opened. When relay E is actuated its contacts 53 and 54 close to shortcircuit the resistor 50 thereby increasing the frequency of the pulses for operation of the power or rotary switch 11. With a given set of values for resistors 49 and 50, the shortcircuiting of resistor 50 can be made to increase the speed of the rotary switch 11 up to its maximum operational speed and enable the operator to quickly detect any spread of fire or rise in temperature to other stations in the aircraft where detectors R may be located.

Upon extinguishment of all fires or a reduction of temperature the operator having control of the reset switch 87 and master light M, will operate the switch to open the electrical locking circuit for relay E. This opens its contacts extinguishing lamp M and returning or reducing the scanning speed of switch 11 to its normal rate. This action all occurs without any interruption of the indicating process.

Periodically the operator may desire to test the equipment in order to assure himself that each of the detectors R are in operative condition. This is accomplished by depressing the switch 60, to open the shunting circuit across R'. Since the equipment is operating normally, the bridge 62 will receive a temperature change indication from each of the several detectors R because the resistor R' is of a value, which when placed in series with a detector R will present a resistance to the bridge equivalent to that produced by a heated detector. Each lamp L will be successively lighted thereby indicating that their associated or companion detectors R are in operable condition. Simultaneously therewith the scanning speed will increase and the master indicating lamp M will be illuminated. Thus having tested all circuits of the alarm system, the switch 60 is restored to its normal closed position and the reset switch 87 is momentarily depressed to restore all circuits to their normal operating conditions.

From the foregoing, it is apparent that this system provides a relatively simple and effective device for the detection of fire or temperature change and because of its stability and sensitivity is especially useful and desirable for applications where severe vibration is encountered. The voltage regulation for the amplifying circuits renders the system relatively free from any random or periodic voltage fluctuations to which systems of this general type are sensitive. Furthermore under conditions where fire may spread rapidly, this device, once detecting fire at a single station, automatically increases its scanning speed so that more rapid indications of the conditions at all secondary stations will be received at the central station.

Although the embodiment of this invention chosen for the purpose of this disclosure employs such elements as an eight position electromagnetic rotary switch, visual indicating means, particular relay control arrangements and the like, it is intended that the invention be construed to include any suitable equivalents thereof.

What is claimed:

1. In a temperature measuring device, a plurality of detectors each consisting of a material having a relatively large temperature coefficient of resistance and wherein a change of resistance indicates a change in its ambient temperature, an indicator including a Wheatstone bridge responsive to indicate a variation in resistance in one or more of said detectors, an electro-mechanically operated selector switch, including an oscillator as the driving means therefor, to successively and repeatedly connect each resistor to said indicator, and means operable by and from said indicator to increase the oscillator frequency upon response of the indicator to a change in resistance of one or more of said detectors.

2. In a temperature measuring device, the combination with an electronic oscillator, of a selector switch operated thereby having at least two banks of contacts, each bank arranged to define a circular figure and a contact arm individual to each bank, said arms being concurrently stepped from contact to contact by said oscillator at a rate determined by the frequency thereof, a plurality of temperature responsive resistors, an electronic amplifier including a Wheatstone bridge, said amplifier and resistors being connected in circuit with one bank of contacts aforesaid to successively and repeatedly connect each resistor to said amplifier, an indicating lamp individual to each resistor in circuit with the remaining contact bank and the amplifier to visibly indicate a change in temperature at said resistor, and means in circuit with said amplifier and oscillator to alter the frequency of the latter upon the response of said amplifier to a change in temperature at one or more of said resistors.

3. In a temperature measuring device, the combination with an electronic oscillator, of a selector switch operated thereby having at least two banks of contacts each and a contact arm individual to each bank, said arms being concurrently stepped from contact to contact of their respective banks at a rate determined by the frequency of said oscillator, a plurality of temperature responsive resistors, an electronic amplifier including a Wheatstone bridge, said amplifier and said resistors being connected in circuit with the contacts of one bank to successively and repeatedly connect each resistor to said amplifier, an indicating lamp individual to each resistor and with the contacts of the remaining contact bank, said lamps being placed successively by the switch in circuit with the amplifier to visibly indicate a change in its associated resistor, relay means in circuit with said amplifier and oscillator to alter the frequency of the latter upon response of said amplifier to a change in temperature at one or more of said resistors, and switch means for restoring said first oscillator frequency.

4. In a temperature measuring device, the combination with an electronic oscillator, of a selector switch operated thereby having at least two banks of contacts and a contact arm for each bank to be concurrently moved from contact to contact of their respective banks at a rate determined by the frequency of said oscillator, a plurality of temperature responsive resistors, an electronic amplifier including a Wheatstone bridge, said amplifier and resistors being connected in circuit with one of said banks to successively and repeatedly connect each resistor to said amplifier, an indicating lamp associated with each resistor in circuit with one of the contacts of the remaining bank and the amplifier to visibly indicate a change in temperature at said resistor, a master indicating lamp, relay means in circuit with said amplifier, oscillator and master indicating lamp to illuminate the latter and increase the frequency of said oscillator upon a change in temperature at one or more of said resistors, and whitch means for restoring said first oscillator frequency and extinguishing said master lamp.

5. An electrical alarm system comprising in combination a plurality of detector elements each consisting of wire having a relatively large temperature coefficient of resistance, a rotary selector switch having at least two contact arms operating in unison, an electronic oscillator rotating said switch, a series of contacts for each of said contact arms, a resistance bridge consisting of four branches one of which consists of one of said detectors, electric circuits interconnecting said detectors, bridge and the contacts of one series wherein the detectors are successively and repeatedly substituted one for the other as one leg of the bridge by one of the contact arms as the switch rotates, a thyratron amplifier connected with and responsive to voltage changes in said bridge produced by variations in the resistance of the detector in circuit therewith, and an individual indicating lamp associated with each detector in circuit with the contacts of the remaining series of contacts, said lamp being illuminated by said amplifier upon the latter's response to a resistance change in its then associated detector.

6. An electrical fire alarm system comprising in combination a plurality of detectors each consisting of material having a relatively large temperature coefficient of resistance, an electronic oscillator, a rotary selector switch driven thereby including a pair of contact arms operated in unison thereby, two series of contacts one for coaction with each of said arms, a resistance bridge consisting of four branches one of which comprises a detector aforesaid, electric circuits connecting said detectors, bridge and one series of contacts whereby the detectors are successively and repeatedly substituted one for the other as one leg of the bridge by the coacting arm upon the rotation of said switch, a thyratron amplifier connected with and responsive to voltage changes in said bridge produced by variations in the resistance of the connected detector, an indicating lamp individual to each detector in circuit with the remaining series of contacts and actuated by said amplifier upon the latter's response to a resistance change at the associated detector, and relay means interconnecting said amplifier and oscillator to increase the oscillator frequency upon actuation of said amplifier.

7. An electrical fire alarm system comprising in combination a plurality of detector elements each consisting of material having a relatively large temperature coefficient of resistance, an electronic oscillator, a rotary selector switch driven thereby having a pair of contact arms, two series of contacts one series for coaction with each of said arms, a resistance bridge having four branches one of which consists of one of said detectors, electric circuits connecting said detectors, bridge and one series of contacts whereby the detectors are successively and repeatedly substituted one for the other as one leg of the bridge as the switch and the contact arm thereof coacting with said series rotate, a thyratron amplifier connected with and responsive to voltage changes in said bridge produced by variations in the resistance of a detector, an indicating lamp individual to each detector in circuit with the remaining series of contacts and actuated by said amplifier upon its response to a resistance change at the then associated detector, relay means interconnecting said amplifier and oscillator to increase the frequency of the latter upon actuation of said amplifier, electrical locking contacts in circuit with said relay means to maintain the oscillator at the increased frequency, and a manually operable switch to interrupt said locking circuit and permit the return of the oscillator to its initial frequency.

8. An electrical alarm system comprising in combination a plurality of detector elements each consisting of material having a relatively large temperature coefficient of resistance, an electronic oscillator, a rotary selector switch driven thereby, two series of contacts independently under the control of said switch, a resistance bridge of four branches one of which consists of one of said detectors, electric circuits connecting said detectors, bridge and one series of contacts whereby the detectors are successively and repeatedly substituted one for the other as one leg of the bridge as the switch rotates, a thyratron amplifier connected with and responsive to voltage changes in said bridge produced by variations in the resistance at said detectors, an indicating lamp individual to each detector in circuit with the remaining series of contacts and actuated by said amplifier upon the response thereof to a resistance change at the detector then in association with a lamp, a master indicating lamp, relay means in circuit with said amplifier, oscillator and master lamp to increase the oscillator frequency and illuminate the master lamp upon actuation of said amplifier, electrical locking contacts in circuit with said relay, means to maintain the oscillator at the increased frequency and the master lamp illuminated, and a manually operated switch in series with said locking contacts to extinguish the lamp and restore the oscillator to its initial frequency.

9. In a temperature measuring system including a series of temperature responsive resistors and a corresponding series of indicating lamps, a central station comprising an electronic oscillator, a selector switch having two banks of contacts, the contacts of one bank being adapted to be associated in circuit with the resistors of the system and the contacts of the other bank being adapted to be associated in circuit with the indicating lamps of the system and a contact arm individual to each bank of contacts, said arms being concurrently stepped from contact to contact of their respective banks by said oscillator at a rate determined by the frequency thereof, an electronic amplifier including a Wheatstone bridge, said amplifier being connected in circuit with the contacts of the bank associated with the resistors as aforesaid and also being connected in circuit with the contacts of the bank associated with the indicating lamps as aforesaid, whereby the contacts associated with the resistors are successively and repeatedly connected to said amplifier and said amplifier is successively and repeatedly connected to the contacts associated with the indicating lamps to visibly indicate any changes in temperature at the resistors, and means in circuit with said amplifier and oscillator to alter the frequency of the latter upon response of said amplifier to a change in temperature at one or more of the resistors.

10. In a temperature measuring system embodying a plurality of temperature responsive resistors and an indicating lamp individual to each resistor, a central station comprising an electronic oscillator, a selector switch operated thereby having two banks of contacts and a contact arm individual to each bank, said arms being concurrently stepped from contact to contact of their respective banks at a rate determined by the frequency of said oscillator and the contacts of one bank being adapted for electrical connection with the resistors of the system and the contacts of the remaining bank being adapted for electrical connection with the lamps of the system, an electronic amplifier including a Wheatstone bridge, said amplifier being connected in circuit with the contacts of one bank to successively and repeatedly connect each contact thereof and any connected resistor to said amplifier, and the contacts of the remaining bank being connected in circuit with said amplifier whereby the lamps of the system may be placed by the switch successively in circuit with the amplifier to visibly indicate a change in its corresponding resistor, relay means in circuit with said amplifier and oscillator to alter the frequency of the latter upon response of said amplifier to a change in temperature at one or more of the resistors of the system, and switch means for restoring said first oscillator frequency.

11. In a temperature measuring system, a central station comprising an electronic oscillator, a selector switch operated thereby having two banks of contacts and a contact arm for each bank to be concurrently moved from contact to contact of their respective banks at a rate determined by the frequency of said oscillator, an electronic amplifier including a Wheatstone bridge, said amplifier being connected in circuit with the first of said banks to successively and repeatedly connect each contact of said bank to said amplifier, and electrical connections between the contacts of the remaining or second bank and the amplifier, a master indicating lamp, relay means in circuit with said amplifier, oscillator and master indicating lamp to illuminate the latter and increase the frequency of said oscillator upon a change in temperature conditions in association with one or more of the contacts of the first bank, and switch means for restoring said first oscillator frequency and extinguishing said master lamp.

12. In an electrical alarm system including a plurality of detector elements each consisting of wire having a relatively large temperature coefficient of resistance, a central station comprising a rotary selector switch having at least two contact arms operating in unison, and electronic oscillator rotating said switch, a series of contacts for each of said contact arms, one series being detector contacts for connection with the several detector elements of the system, and the other series being indicator contacts, a resistance bridge of four branches one of which consists of one of the detector contacts, electric circuits interconnecting said detector contacts and bridge whereby the detector contacts are successively and repeatedly substituted one for the other as one leg of the bridge by one of the contact arms as the switch rotates, a thyratron amplifier connected with and responsive to voltage changes in said bridge produced by variations in the resistance of a detector element associated with one of the detector contacts in circuit therewith, and means whereby an indicator may be associated with each indicator contact of the switch to be operated by said amplifier as the latter responds to a resistance change as aforesaid.

13. In an electrical fire alarm system including a plurality of detectors each consisting of material having a relatively large temperature coefficient of resistance and a plurality of visual indicators each corresponding to one of said detectors, a central station comprising an electronic oscillator, a rotary selector switch driven thereby consisting of a pair of contact arms operated in unison thereby in combination with two series of contacts one for coaction with each of said arms and one series being detector contacts to be individually connected to one of the several detectors of the system and the other series being indicator contacts to be individually connected to one of the indicators of the system, a resistance bridge consisting of four branches one of which consists of a detector of the system, electric circuits connecting said detector contacts and bridge whereby the detector contacts and associated detectors are successively and repeatedly substituted one for the other as one leg of the bridge by the coacting arm upon the rotation of said switch, a thyratron amplifier connected with and responsive to voltage changes in said bridge produced by variations in the resistance of the connected detector, connections through indicator contacts whereby said amplifier upon its response to a resistance change selectively actuates the indicators of the system, and relay means interconnecting said amplifier and oscillator to increase the oscillator frequency upon actuation of said amplifier.

14. In an electrical fire alarm system including in combination a plurality of detector elements each consisting of material having a relatively large temperature coefficient of resistance and a plurality of corresponding indicators, a central station comprising an electronic oscillator, a rotary selector switch driven thereby, having a pair of contact arms and two series of contacts one series for association with the detectors of the system and the other for association with the indicators of the systems, each series coacting with one of said arms, a resistance bridge having four branches or legs, electric circuits connecting said bridge and one series of contacts whereby the detectors may be successively and repeatedly substituted one for the other as one leg of the bridge as the switch and the contact arm thereof coacting with said series rotate, a thyratron amplifier connected with and responsive to voltage changes in said bridge produced by variations in the resistance of a detector, circuits for associating indicators, individual to each detector, with the indicator contacts and the amplifier whereby said indicators may be actuated by the amplifier upon its response to a resistance change at the detector then associated with the bridge, relay means interconnecting said amplifier and oscillator to increase the frequency of the latter upon actuation of said amplifier, electrical locking contacts in circuit with said relay means to maintain the oscillator at the increased frequency, and a manually operable switch to interrupt said locking circuit and permit the return of the oscillator to its initial frequency.

15. In an electrical alarm system including a plurality of detector elements each consisting of material having a relatively large temperature coefficient of resistance and a plurality of corresponding indicators, a central station comprising an electronic oscillator, a rotary selector switch driven thereby, two series of contacts independently under the control of said switch, one series adapted to be connected to the detectors of the system and the other series adapted to be connected to the indicators of the system, a resistance bridge of four branches, electric circuits connecting said bridge and the contacts of the series adapted to be connected to the detectors whereby the connected detectors may be successively and repeatedly substituted one for the other as one leg of the bridge as the switch rotates, a thyratron amplifier connected with and responsive to voltage changes in said bridge produced by variations in the resistance at the connected detectors, circuits between the remaining series of contacts and the amplifier whereby the connected indicators may be actuated by said amplifier upon the response thereof to a resistance change at a detector then in association with the bridge, a master indicating lamp, relay means in circuit with said amplifier, oscillator and master lamp to increase the oscillator frequency and illuminate the master lamp upon actuation of said amplifier, electrical locking contacts in circuit with said relay, means to maintain the oscillator at the increased frequency and the master lamp illuminated, and a manually operated switch in series with said locking contacts to extinguish the lamp and restore the oscillator to its initial frequency.

16. An electrical signalling system comprising in combination a plurality of detectors each responsive to record changes in a predetermined condition, an indicator, a sequence switch including driving means therefor to individually and repeatedly connect each detector in sequence to said indicator, means operable by and from said indicator to accelerate the driving means upon the response of one or more detectors to a change in said predetermined condition, and testing means including a resistor and switch means for connecting said resistor in circuit with said detectors and indicator to simulate a change in the predetermined condition at each of said detectors.

17. In a temperature measuring device, a plurality of detectors each consisting of a material having a relatively large temperature coefficient of resistance and wherein a change of resistance indicates a change in its ambient temperature, an indicator including a Wheatstone bridge responsive to indicate a variation in resistance in one or more of said detectors, an electro-mechanically operated selector switch, including an oscillator as the driving means therefor, to successively and repeatedly connect each detector to said indicator, a relatively stable resistor, and means for connecting said resistor in circuit with said indicator and detectors to successively simulate a resistance change in each of said detectors.

18. The combination with a plurality of secondary stations, each having a detector responsive to changes in ambient temperature, of a central station including a plurality of signals each companion to and denoting one of said secondary stations and its detector, means for successively connecting each detector to its signal at a predetermined speed, means for activating any signal upon a change in the ambient temperature at its connected detector, and means connected with and operable by the means for activating said signals to increase the predetermined speed of connection between each detector and its signal.

19. The combination with a plurality of independent secondary stations, each having a detector responsive to an increase in ambient temperature, of a central station including a plurality of independent signals each companion to and denoting one of said secondary stations and its detector, scanning means for successively connecting each detector to its signal at periodic time intervals, means for activating any signal when its connected detector responds to an increase in ambient temperature, and means connected to and operable by the means for activating said signals for changing the operation of the scanning means to decrease the periodic time intervals aforesaid.

20. The combination with a plurality of independent secondary stations, each having a detector responsive to an increase in ambient temperature, of a central station including a plurality of independent signals each companion to and denoting one of said secondary stations and its detector, scanning means for successively connecting each detector to its signal at periodic time intervals, means for activating any signal when its connected detector responds to an increase in ambient temperature, means interposed between the scanning means and the means for activating the signals and operable by the latter to establish and maintain an increase in the frequency of the periodic time intervals aforesaid upon the activation of a signal, and means to restore the original frequency of said periodic time intervals.

21. The combination with a plurality of independent secondary stations, each having a detector responsive to an increase in ambient temperature, of a central station including a plurality of independent signals each companion to and denoting one of said secondary stations and its detector, scanning means for successively connecting each detector to its signal at periodic time intervals, means common to all of said signals for activating any signal when its connected detector responds to an increase in ambient temperature, means connected with and operable by the means for activating said signals for controlling the operation of the scanning means to establish and maintain an increase in the frequency of the periodic time intervals aforesaid upon the activation of a signal, independent means for controlling the operation of said scanning means to restore the original frequency of said periodic time intervals, and means successively connectable to the several detectors during the scanning thereof to temporarily simulate an increase in ambient temperature at each detector.

22. An electrical signalling system consisting of a plurality of independent detectors each comprising a material having a relatively large temperature coefficient of resistance and wherein a change of resistance indicates a change in its ambient temperature, an indicator including a Wheatstone bridge responsive to a variation in resistance at one or more of the detectors, a plurality of signals each companion to and denoting one of said detectors, an electro-mechanically operated selector switch to successively and repeatedly connect each detector to its signal, means under the control of the Wheatstone bridge for activating any signal when its connected detector responds to an increase in ambient temperature, and means connected with said activating means operable to increase the speed of operation of the selector switch upon the activation of a signal.

23. An electrical signalling system consisting in the combination of a plurality of detectors each comprising a material having a relatively large temperature coefficient of resistance and wherein a change of resistance indicates a change in its ambient temperature, with an indicator including a Wheatstone bridge responsive to indicate a variation in resistance at one or more of the detectors, an electro-mechanical selector switch, including an oscillator as its driving means, to successively and repeatedly connect each detector to said indicator, means for increasing the frequency of the oscillator upon a change in resistance at one or more of the detectors, and a test resistor to be connected in circuit with each of said detectors to simulate a change in ambient temperature.

BERTRAM E. SEALANDER.
RICHARD S. BERGEN.

No references cited.